United States Patent Office 3,399,215
Patented Aug. 27, 1968

3,399,215
PURIFICATION OF p-DIOXENES BY AZEOTROPIC DISTILLATION WITH WATER
Walter H. Brader, Jr., Houston, Tex., assignor to Jefferson Chemical Company, Inc., Houston, Tex., a corporation of Delaware
No Drawing. Original application Apr. 15, 1965, Ser. No. 448,275. Divided and this application Nov. 13, 1967, Ser. No. 682,534
5 Claims. (Cl. 260—340.6)

ABSTRACT OF THE DISCLOSURE

A crude p-dioxene is purified by diluting the crude p-dioxene with water, distilling the mixture to obtain and collect a p-dioxene-water azeotrope, separating the azeotrope into a water phase and a p-dioxene phase, drying the p-dioxene phase, adding a drying agent thereto and then fractionally distilling to obtain a pure p-dioxene product.

Reference to other applications

This application, a division of copending application Serial No. 448,275 filed April 15, 1965, and entitled "Preparation of p-Dioxenes," is directed to the method of purifying p-dioxenes disclosed and claimed therein.

Description of the preferred embodiment

Because of the closeness of the boiling points of the components of the reactor effluent the purification of the p-dioxene product is difficult. However, I found that the p-dioxene can be readily purified by adding sufficient water to bring the total water content to an amount at least equivalent to that needed for the p-dioxene-water azeotrope. The distillation is then carried out at atmospheric pressure and the azeotrope collected. The dioxene phase is separated, dried. If a colorless product is desired a small quantity of a hydrogenation agent such as an alkali metal borohydride or alkali metal aluminum hydride is added and the p-dioxene is fractionated by distillation to give a pure, colorless product. Only a very small amount of reducing agent, ranging from a finite amount to about 0.5 wt. percent based on the p-dioxene present, is needed.

The dioxene phase may be dried by any known technique after separation from the azeotrope. For example, it may be dried by the use of molecular sieves, solid drying agents or azeotroping with benzene. The last method is probably the most practical on a commercial scale.

This invention is concerned with the purification of p-dioxenes. More particularly, this invention is concerned with the preparation of p-dioxenes from diglycols by a catalytic process which involves both dehydration and dehydrogenation.

The p-dioxenes are relatively new cyclic olefins. In United States Patent 3,072,623, it is disclosed that the simplest member of the series, p-dioxene, can be polymerized to yield a polymer having a melting point in excess of 250° C. and a partial water solubility.

Heretofore, p-dioxene has been prepared by the reaction of an aliphatic Grignard reagent with 2,3-dichlorodioxane as shown by the following equation:

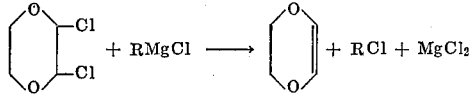

While this reaction is satisfactory for preparing small quantities of p-dioxene, it is not suitable for use in a commercial operation.

In United States Patent 2,807,629, the dehydrogenation of diethylene glycol is shown to yield p-dioxanone.

A similar treatment of higher aliphatic diglycols results in a formation of some substituted p-dioxene.

The dehydrogenation of diethylene glycol to p-dioxanone is believed to involve an intermediate hemiacetal as shown below:

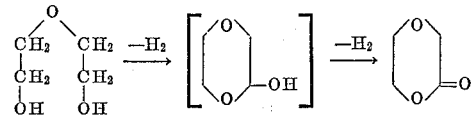

It is known that secondary alcohols dehydrogenate faster than primary alcohols; thus, one skilled in the art would expect the intermediate p-dioxanol to dehydrogenate more rapidly than would the primary hydroxyl group of diethylene glycol and, thus, p-dioxanone is the expected product.

A method for the preparation of p-dioxenes from diglycols containing primary and/or secondary hydroxyl groups is disclosed by Summerbell et al. in an article entitled, "Copper Chromite—Catalyzed Conversion of Some Glycols to Dioxenes" (Journal of Organic Chemistry, 1962, vol. 27, pages 4433–4436). In accordance with this process, the diglycol is reacted in the vapor phase at a temperature within the range of about 250° to about 350° C. over a catalyst which is a combination of a metallic dehydrogenation catalyst with a dehydration catalyst. It is believed to be this dual dehydrogenation-dehydration character of the catalyst that leads to the unexpected results described herein.

Metallic dehydrogenation catalysts are well known to those skilled in the art. Generally, such catalysts include, but are not limited to, the metals or oxides of the metals of Groups I-b and VIII. Examples of such dehydrogenation catalysts include copper, silver, gold, nickel, zinc, platinum, palladium, cobalt, and the oxides thereof. The oxides of copper are preferred, particularly cupric oxide.

It is to be understood that when a metallic oxide is used, some reduction occurs under the conditions of the reaction. Thus, when it is said that cupric oxide is the preferred catalyst, it is to be understood that the catalyst will be a mixture of metallic copper, cuprous oxide and cupric oxide after the reaction has proceeded for a short time.

Dehydration catalysts are also well known to those skilled in the art. Examples of dehydration catalysts include alumina, silica, silica-alumina, magnesia, activated clays, aluminum phosphate, iron phosphate, etc.

The relative amount of each type catalyst to be used will depend upon the particular catalyst pair employed. For a given catalyst pair, the proper amount of each to be used can be readily determined by running two or three brief experiments such as are described in the examples. In general, it may be said that the catalyst will comprise from about 75 to about 1 wt. percent dehydrogenation catalyst and, correspondingly, from about 25 to about 99 wt. percent dehydration catalyst.

The reaction should be conducted in the vapor phase at a temperature within the range of about 250° to about 350° C. The liquid diglycol is fed to the reactor at a space velocity of from about 0.5 to about 3.0 cc. of diglycol per hour per cc. of catalyst. A carrier gas is preferably employed at a space velocity of 100 to 500 cc. per hour per cc. of catalyst. The preferred carrier gases are air, oxygen, or mixtures of nitrogen and oxygen; however, other gaseous materials such as hydrogen or nitrogen may also be used.

The invention will be further illustrated by the following examples. The examples were conducted in a cylindrical stainless steel reactor with dimensions of 1 x 30 inches. The reactor tube was surrounded by a 4-inch jacket, to which jacket was attached a condenser and liquid return system. The jacket was filled with a heat transfer liquid and the reactor temperature was controlled by adjusting the pressure above the refluxing liquid. The reactor was packed so that from 100–200 cc. of catalyst were held in the center of the reaction tube and the area above the catalyst was filled with inert material to act as a preheater. The diglycol and carrier gas were introduced at the top of the reactor. The reactants were allowed to flow through the reactor and were collected in a flask to which was attached a Dry Ice-acetone condenser. The collected product was transferred to a column and fractionated.

In a typical experiment diethylene glycol was pumped at a space velocity of one cc./cc. catalyst/hour and air metered at 120 cc. gas/cc. catalyst/hour into the top of the reactor. The reactants flowed downward through the reactor and collected in a round-bottom flask which was immersed in a Dry Ice-acetone bath and to which was attached a Dry Ice-acetone condenser. Reactions were usually carried out for a period of 4–6 hours.

To the product so obtained was added sufficient water to azeotrope all of the p-dioxene, and the product was distilled at atmospheric pressure. The water-p-dioxene azeotrope was collected (B.P. 79° C.), the phases were separated and the organic phase was dried. In order to discharge the yellow color of the dry p-dioxene a few grams of sodium borohydride may be added and the mixture distilled to give pure, colorless p-dioxene.

For pure p-dioxene, the boiling point was 93° C., the refractive index was 1.4320 at 30° C. and the specific gravity was 1.084 at 20° C.; the water azeotrope boiled at 79° C. The 5-methyl-p-dioxene azeotrope boiled at 86° C. and the 2-methyl-p-dioxene azeotrope boiled at 99° C.

EXAMPLE I

Diethylene glycol (1,775 grams) was pumped at a space velocity of 1 into the reactor filled with 110 cc. of 10% copper oxide on an active alumina support and held at 290° C. Concurrent with the feed, air was passed at a vapor space velocity of 150–300 cc. per hour per cc. of catalyst. Under these conditions a diethylene glycol conversion of 82% was obtained with a p-dioxene yield of 40 mol percent and a p-dioxene yield of 47 mol percent.

EXAMPLE II

In this example, a dehydrogenation catalyst was used without a dehydration carrier. In essentially the same manner as in Example I, except that no carrier gas was used, 527 grams of diethylene glycol was converted over 100 cc. of copper chromite catalyst (80% copper oxide, 17% chromia) in a reactor held at 295° C. The conversion of diethylene glycol was 83% and a yield of p-dioxanone of 81 mol percent was obtained. No p-dioxene or p-dioxane was observed.

EXAMPLE III

Example I was repeated except that hydrogen was used to replace the air as a carrier gas. The diethylene glycol conversion was 88%, the p-dioxene yield was 31 mol percent, the p-dioxane yield was 35 mol percent and the p-dioxanone yield was 28 mol percent.

EXAMPLE IV

In essentially the same manner as in Example I, diethylene glycol was converted over a copper oxide on activated clay catalyst. Conversion of diethylene glycol was 31% with a p-dioxene yield of 45 mol percent, a p-dioxane yield of 10 mol percent and a p-dioxanone yield of 6 mol percent.

EXAMPLE V

In essentially the same manner as in Example I, 3-oxahexane-1,5-diol was converted over a 10% copper oxide on active alumina catalyst. The conversion was 87% and the yield of 2-methyldioxene was 52 mol percent, the yield of 5-methyldioxene was 22 mol percent and the yield of 2-methyldioxane was 5 mol percent.

Because of the closeness of the boiling points of the components of the reactor effluent the purification of the p-dioxene product is difficult. However, I found that the p-dioxene can be readily purified by adding sufficient water to bring the total water content to an amount at least equivalent to that needed for the p-dioxene-water azeotrope. The distillation is then carried out at atmospheric pressure and the azeotrope collected. The dioxene phase is separated, dried. If a colorless product is desired, a small quantity of a hydrogenation agent such as an alkali metal borohydride or alkali metal aluminum hydride is added and the p-dioxene is fractionated by distillation to give a pure, colorless product. Only a very small amount of reducing agent, ranging from a finite amount to about 0.5 wt. percent on the p-dioxene present, is needed.

The dioxene phase may be dried by any known technique after separation from the azeotrope. For example, it may be dried by the use of molecular sieves, solid drying agents or azeotroping with benzene. The last method is probably the most practical on a commercial scale.

In accordance with my process, diglycols having the formula:

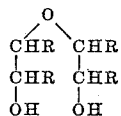

may be selectively converted to the corresponding p-dioxene regardless of whether the hydroxyl groups involved are primary or secondary hydroxyl groups. The p-dioxenes that can be obtained will thus be those having the formula:

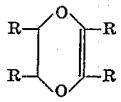

wherein each R is selected from the group consisting of hydrogen and $C_1$–$C_4$ alkyl groups. The process will find its greatest application in the conversion of those diglycols containing primary hydroxyl groups. Ordinarily, such diglycols would be expected to yield p-dioxanones in preference to p-dioxenes. The preferred starting material is diethylene glycol, which is converted into p-dioxene. Other diglycols that can be used include dipropylene glycol, dibutylene glycol, 3-oxahexane-1,5-diol and 3-oxaheptane-1,5-diol.

I claim:

1. A method for purifying a crude p-dioxene having the formula:

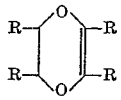

wherein each R is selected from the group consisting of hydrogen and $C_1$–$C_4$ alkyl groups which comprises adding to the crude p-dioxene an amount of water sufficient to form an azeotrope with said p-dioxene, distilling said mixture and collecting said azeotrope and separating the p-dioxene phase from the aqueous phase of said azeotrope, and fractionally distilling said p-dioxene phase to give a pure product.

2. In a method for the preparation of a p-dioxene having the formula:

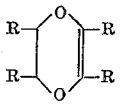

each R being selected from the group consisting of hydrogen and $C_1$–$C_4$ alkyl groups, wherein the corresponding diglycol is contacted in the vapor phase at a temperature within the range of about 250° to about 350° C., at a space velocity of from about 0.5 to about 3.0 cc. of liquid feed per hour per cc. of catalyst with a catalyst which comprises from about 1 to about 75 wt. percent of a metallic dehydrogenation catalyst and, correspondingly, from about 99 to about 25 wt. percent of a dehydration catalyst, the improvement which comprises collecting the effluent from the reaction, adding an amount of water sufficient to form an azeotrope with said p-dioxene, distilling said mixture, collecting said azeotrope, separating the p-dioxene phase of said azeotrope from the aqueous phase thereof, drying said p-dioxene phase, adding a hydrogenating agent and fractionally distilling said p-dioxene phase to obtain a pure p-dioxene product.

3. A method as in claim 2 wherein the dehydrogenation catalyst is cupric oxide.

4. A method as in claim 3 wherein R is hydrogen.

5. A method as in claim 2 wherein the hydrogenating agent is selected from the group consisting of alkali metal borohydrides and alkali metal aluminum hydrides.

References Cited

UNITED STATES PATENTS 3,149,130  9/1964  Guest _____ 260—340.6

OTHER REFERENCES

Summerbell et al.: "Journal of Organic Chemistry," vol. 27 (1962), pp. 4433–4436.

WILBUR L. BASCOMB, JR., *Primary Examiner.*